(12) United States Patent
Vadayadiyil Raveendran et al.

(10) Patent No.: US 11,366,641 B2
(45) Date of Patent: Jun. 21, 2022

(54) GENERATING MICROSERVICES FOR MONOLITHIC SYSTEM USING A DESIGN DIAGRAM

(71) Applicant: KYNDRYL, INC., New York, NY (US)

(72) Inventors: Pramod Vadayadiyil Raveendran, Bengaluru (IN); Seema Nagar, Bangalore (IN); Sougata Mukherjea, New Delhi (IN); Kuntal Dey, Rampurhat (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/064,514

(22) Filed: Oct. 6, 2020

(65) Prior Publication Data
US 2022/0107785 A1 Apr. 7, 2022

(51) Int. Cl.
*G06F 9/445* (2018.01)
*G06F 8/10* (2018.01)
(Continued)

(52) U.S. Cl.
CPC .............. *G06F 8/20* (2013.01); *G06F 8/36* (2013.01); *G06F 9/22* (2013.01); *G06F 40/279* (2020.01);
(Continued)

(58) Field of Classification Search
CPC ..... G06F 8/20; G06F 8/36; G06F 8/10; G06F 8/35; G06F 8/34; G06F 8/60; G06F 8/65;
(Continued)

(56) References Cited

U.S. PATENT DOCUMENTS

| 8,181,153 | B2 * | 5/2012 | Grechanik | G06F 8/72 717/111 |
| 8,713,062 | B2 | 4/2014 | Bobick | |

(Continued)

FOREIGN PATENT DOCUMENTS

| AU | 2019210601 B2 | 9/2020 |
| CN | 1695282 A | 11/2005 |

(Continued)

OTHER PUBLICATIONS

Sinan Eski et al., An Automatic Extraction Approach—Transition to Microservices Architecture from Monolithic Application, May 21-25, 2018, [Retrieved on Nov. 13, 2021]. Retrieved from the internet: <URL: https://dl.acm.org/doi/pdf/10.1145/3234152.3234195> 6 Pages (1-6) (Year: 2018).*

(Continued)

*Primary Examiner* — Anibal Rivera
(74) *Attorney, Agent, or Firm* — Ken Han; Andrew M. Calderon; Roberts Calderon Safran & Cole P.C.

(57) ABSTRACT

A computer generates a set of microservices associated with a monolithic system using a design diagram. The computer receives a system design diagram depicting a monolithic system and associated code artefacts. The computer identifies, using an object detection algorithm, a set of predefined shapes in the diagram, and each shapes is characterized by positioning coordinates. The computer extracts from the design diagram, using a text recognition algorithm, text associated with the shapes and labels them accordingly. The computer identifies, using the positioning coordinates, relationships among the predefined shapes. The computer arranges the predefined shapes into a hypergraph in accordance with, at least in part, the identified relationships. The computer determines similarity values between code artefacts and shape labels and associates artefacts with shapes accordingly. The computer groups, using a community (Continued)

detection algorithm, operatively-related nodes into a plurality of microservice node communities that represents the monolithic system.

20 Claims, 7 Drawing Sheets

(51) Int. Cl.
| | |
|---|---|
| *G06F 8/35* | (2018.01) |
| *G06F 8/20* | (2018.01) |
| *G06F 9/22* | (2006.01) |
| *G06T 7/60* | (2017.01) |
| *G06F 40/279* | (2020.01) |
| *G06F 8/36* | (2018.01) |
| *G06F 8/72* | (2018.01) |
| *G06F 8/34* | (2018.01) |
| *G06F 8/60* | (2018.01) |

(52) U.S. Cl.
CPC .................. *G06T 7/60* (2013.01); *G06F 8/10* (2013.01); *G06F 8/34* (2013.01); *G06F 8/60* (2013.01); *G06F 8/72* (2013.01)

(58) Field of Classification Search
CPC . G06F 8/72; G06F 40/279; G06F 9/22; G06T 7/60
See application file for complete search history.

(56) References Cited

U.S. PATENT DOCUMENTS

| | | | |
|---|---|---|---|
| 10,430,250 B2 | 10/2019 | Ishikawa | |
| 2018/0365008 A1 | 12/2018 | Chandramouli | |
| 2019/0108067 A1* | 4/2019 | Ishikawa | H04L 41/50 |
| 2019/0250912 A1 | 8/2019 | Gavisiddappa Kodigenahalli | |
| 2020/0125345 A1 | 4/2020 | Belagali | |
| 2021/0026985 A1* | 1/2021 | Rind | G06F 21/316 |
| 2021/0342836 A1* | 11/2021 | Cella | G06Q 50/01 |

FOREIGN PATENT DOCUMENTS

| | | |
|---|---|---|
| WO | 2017025203 A1 | 2/2017 |
| WO | 20180197928 A1 | 11/2018 |

OTHER PUBLICATIONS

Wuxia Jin et al., Service Candidate Identification from Monolithic Systems Based on Execution Traces, 2019 IEEE, [Retrieved on Jan. 26, 2022]. Retrieved from the internet: <URL: https://ieeexplore.ieee.org/stamp/stamp.jsp?tp=&arnumber=8686152> 21 Pages (987-1007) (Year: 2019).*

Muhammad Aslam Jarwar et al., Microservices in Web Objects Enabled IoT Environment for Enhancing Reusability, 2018, [Retrieved on Jan. 26, 2022]. Retrieved from the internet: <URL: https://www.mdpi.com/1424-8220/18/2/352> 21 Pages (1-21) (Year: 2018).*

"CloudHedge", © 2019 CloudHedge Technologies, 9 pages, <https://cloudhedge.io/>.

Handbook of Graph Grammars and Computing by Graph Transformation:, Description Only, Oct. 1999, 3 pages, <https://www.worldscientific.com/worldscibooks/10.1142/4180>.

Amirat, et al., "Refactor Software Architecture Using Graph Transformation Approach", Second International Conference on the Innovative Computing Technology (INTECH 2012), pp. 117-122.

Chen, et al., "From Monolith to Microservices: A Dataflow-Driven Approach", 2017 24th Asia-Pacific Software Engineering Conference, pp. 466-175, <https://www.researchgate.net/publication/323562483_From_Monolith_to_Microservices_A_Dataflow-Driven_Approach>.

Dehghani, Zhamak, "How to break a Monolith into Microservices", martinFowler.com, Apr. 24, 2018, 12 pages, <https://martinfowler.com/articles/break-monolith-into-microservices.html>.

Fritzsch, et al. ,"From Monolith to Microservices: A Classification of Refactoring Approaches", DEVOPS 2018: Software Engineering Aspects of Continuous Development and New Paradigms of Software Production and Deployment, Abstract Only, 7 pages, <https://link.springer.com/chapter/10.1007/978-3-030-06019-0_10>.

Harrison, et al., "Mapping UML designs to Java", Proceedings of the 15th ACM SIGPLAN conference on Object-oriented programming, systems, languages, and applications, vol. 35 (10), Sep. 2000, Abstract Only, 1 page, <https://www.researchgate.net/publication/221321381_Mapping_UML_designs_to_Java>.

Kleppe, et al., "On a Graph-Based Semantics for UML Class and Object Diagrams", Proceedings of the Seventh International Workshop on Graph Transformation and Visual Modeling Techniques (GT-VMT 2008), 17 pages.

Mazlami, et al., "Extraction of Microservices from Monolithic Software Architectures", 2017 IEEE 24th International Conference on Web Services, pp. 524-531.

Mell et al., "The NIST Definition of Cloud Computing", National Institute of Standards and Technology, Special Publication 800-145, Sep. 2011, 7 pages.

Tyszberowicz, et al., "Identifying Microservices Using Functional Decomposition", Aug. 2018, 16 pages, <https://www.researchgate.net/publication/326901590_Identifying_Microservices_Using_Functional_Decomposition>.

Wang, et al., "Identification of Web Service Refactoring Opportunities as a Multi-Objective Problem", 2016 IEEE International Conference on Web Services, pp. 586-593.

Yaldiz, Sunay, "Roundtrip Engineering for Classes: Mapping between UML Diagram and Java Structures based on Poseidon for UML and the Eclipse Platform", Masters Thesis, Technical University Hamburg-Harburg, Germany, Nov. 1, 2004, 135 page.

Yang, et al., "Advances in UML and XML-Based Software Evolution", © 2005 by Idea Group Inc, 375 pages.

* cited by examiner

GENERATING MICROSERVICES FOR MONOLITHIC SYSTEM USING A DESIGN DIAGRAM

BACKGROUND

The present invention relates generally to the field of microservice computer applications and, more specifically, to converting monolithic systems into collections of microservices.

Many traditional software systems use a monolithic architecture, and this kind of system is appropriate in many settings. However, this approach, which combines most or all activities to be accomplished into one application is not always the best design. In some situations, a microservice architecture, which brings flexibility and other known advantages is more appropriate.

Software systems based on monolithic architecture predate software based on microservices, and many aspects already existing in legacy monolithic systems are still relevant. Although manual conversion of monolithic systems into microservices is possible, the task is labor intensive and prone to errors. The use of Artificial Intelligence (AI) can make the conversion process more efficient.

SUMMARY

According to one embodiment of the invention, a computer-implemented method to generate a set of microservices associated with a monolithic system using a design diagram includes receiving, by a computer, a system design diagram depicting a monolithic system. The computer also receives code artefacts associated with the monolithic system. The computer identifies, using an object detection algorithm, a set of predefined shapes from within the diagram, and each shape is characterized by positioning coordinates. The computer extracts from the design diagram, using a text recognition algorithm, text associated with the predefined shapes and labeling the shapes accordingly. The computer identifies, using said positioning coordinates, relationships among the predefined shapes and arranges the shapes into a hypergraph according to those identified relationships. The computer determines similarity values between code artefacts and shape labels and associates the code artefacts with the predefined shapes accordingly. The computer groups, using a community detection algorithm, operatively-related nodes into a plurality of microservice node communities that represents said monolithic system. According to aspects of the invention, the similarity values measure textual similarity between a selected code artefact and a selected system element label. According to aspects of the invention, the identified relationships are selected from a list consisting of node and node, node and edge, node and operational subordinate. According to aspects of the invention, in response to a determination that one shape is, based on the positioning coordinates of said first and second shapes, contained within a second shape, identifying, the first shape as an operational subordinate of the second shape. According to aspects of the invention, the hypergraph contains a plurality of nodes and edges that correspond respectively to boxes and arrows in said design diagram. According to aspects of the invention, the community detection techniques are selected from a list consisting of agglomerative clustering methods and divisive clustering methods. According to aspects of the invention, the artefacts are selected from a list consisting of system functions, system classes, system modules, and system documentation.

According to another embodiment, a system to generate a set of microservices associated with a monolithic system using a design diagram comprises: a computer system comprising a computer readable storage medium having program instructions embodied therewith, the program instructions executable by a computer to cause the computer to: receive a system design diagram depicting a monolithic system; receive code artefacts associated with said monolithic system; identify using an object detection algorithm, a set of predefined shapes from within said diagram, each characterized by positioning coordinates; extract from said design diagram, using a text recognition algorithm, text associated with said predefined shapes and labeling said shapes in accordance with said extracted text; identify using said positioning coordinates, relationships among said predefined shapes; arrange said predefined shapes into a hypergraph in accordance with, at least in part, said identified relationships; determine similarity values between code artefacts and shape labels and associate said code artefacts with the predefined shapes in accordance therewith; and group, using a community detection algorithm, operatively-related nodes into a plurality of microservice node communities that represents said monolithic system.

According to another embodiment, a computer program product to generate a set of microservices associated with a monolithic system using a design diagram, the computer program product comprising a computer readable storage medium having program instructions embodied therewith, the program instructions executable by a computer to cause the computer to: receive, using said computer, a system design diagram depicting a monolithic system; receive, using said computer, code artefacts associated with said monolithic system; identify, using said computer, using an object detection algorithm, a set of predefined shapes from within said diagram, each characterized by positioning coordinates; extract, using said computer, from said design diagram, using a text recognition algorithm, text associated with said predefined shapes and labeling said shapes in accordance with said extracted text; identify, using said computer, using said positioning coordinates, relationships among said predefined shapes; arrange, using said computer, said predefined shapes into a hypergraph in accordance with, at least in part, said identified relationships; determine, using said computer, similarity values between code artefacts and shape labels and associate, using said computer, said code artefacts with the predefined shapes in accordance therewith; and group, using said computer, using a community detection algorithm, operatively-related nodes into a plurality of microservice node communities that represents said monolithic system.

In embodiments according to the present invention, a computer implemented method to optimize input component enablement for several participants in an electronic group meeting includes a computer that identifies a group of communication devices (e.g., computers, telephones, etc.) joined together for use by a group of meeting participants. Each of the communication devices has a microphone, each of the participants is associated with one of the microphones, and some of the participants are characterized by identification attributes (for example, participant name or subject matter expertise). The computer receives audio input from the participants via the microphones and measures certain quality-based attributes of the audio input to provide associated quality metrics. The audio input can include any audio throughput received by the computer, which can include background noise, a participant's voice, and meeting content, as well as audio signal quality assessments. The computer uses these metrics to determine whether any of the input exceeds a quality threshold and places microphones providing quality threshold-exceeding input into an active speaking mode. The computer also evaluates content of participant audio input and identifies a current concept of focus. The computer then places into an active speaking mode any microphones that are associated with participant having identification attributes that correspond to the current concept of focus.

In another embodiment of the invention, a system to optimize input component enablement for a plurality of communication devices each having an input component associated with at least one participant in an electronic group meeting, which comprises:

a computer system comprising a computer readable storage medium having program instructions embodied therewith. The program instructions are executable by a computer to cause the computer to: identify a plurality of communication devices, each having an audio input component, said audio input components each being associated with at least one of a plurality of a group of participants, wherein at least one of said participants is characterized by an identification attribute; receive an audio input from a first of said audio input components; measure preselected qualitative attributes of said audio input to provide a set of quality metrics; determine whether said set of quality metrics exceeds a threshold for quality; place into an active speaking mode said first audio input component when said set of quality metrics exceeds said threshold for quality; evaluate content of said audio input to identify a concept of focus; place into an active speaking mode any audio input component associated with one of said participants characterized by said identification attribute when said identification attribute corresponds to said identified concept of focus.

In another embodiment of the invention, a computer program product optimizes input component enablement for a plurality of participants in an electronic group meeting. The computer program product comprises a computer readable storage medium having program instructions embodied therewith. The program instructions are executable by a computer to cause the computer to: identify a plurality of communication devices, each having an audio input component, said audio input components each being associated with at least one of a plurality of group participants, wherein at least one of said participants is characterized by an identification attribute; receive an audio input from one of said audio input components; measure content and preselected qualitative attributes of said audio input to provide, respectively, a topic of focus and a set of quality metrics; determine whether said set of quality metrics exceeds a threshold for quality; and place into an active speaking mode any audio input component that is associated with one of said participants having an identification attribute corresponding to said topic of focus or for which said set of quality metrics exceeds said threshold for quality.

The present disclosure recognizes the shortcomings and problems associated with manual conversion of monolithic computer applications into microservices. The method identifies shapes, relative locations, and text content of components in a monolithic system design diagram, associates those components with received monolithic system code artefacts, and generates a set of microservices that represents the monolithic system.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
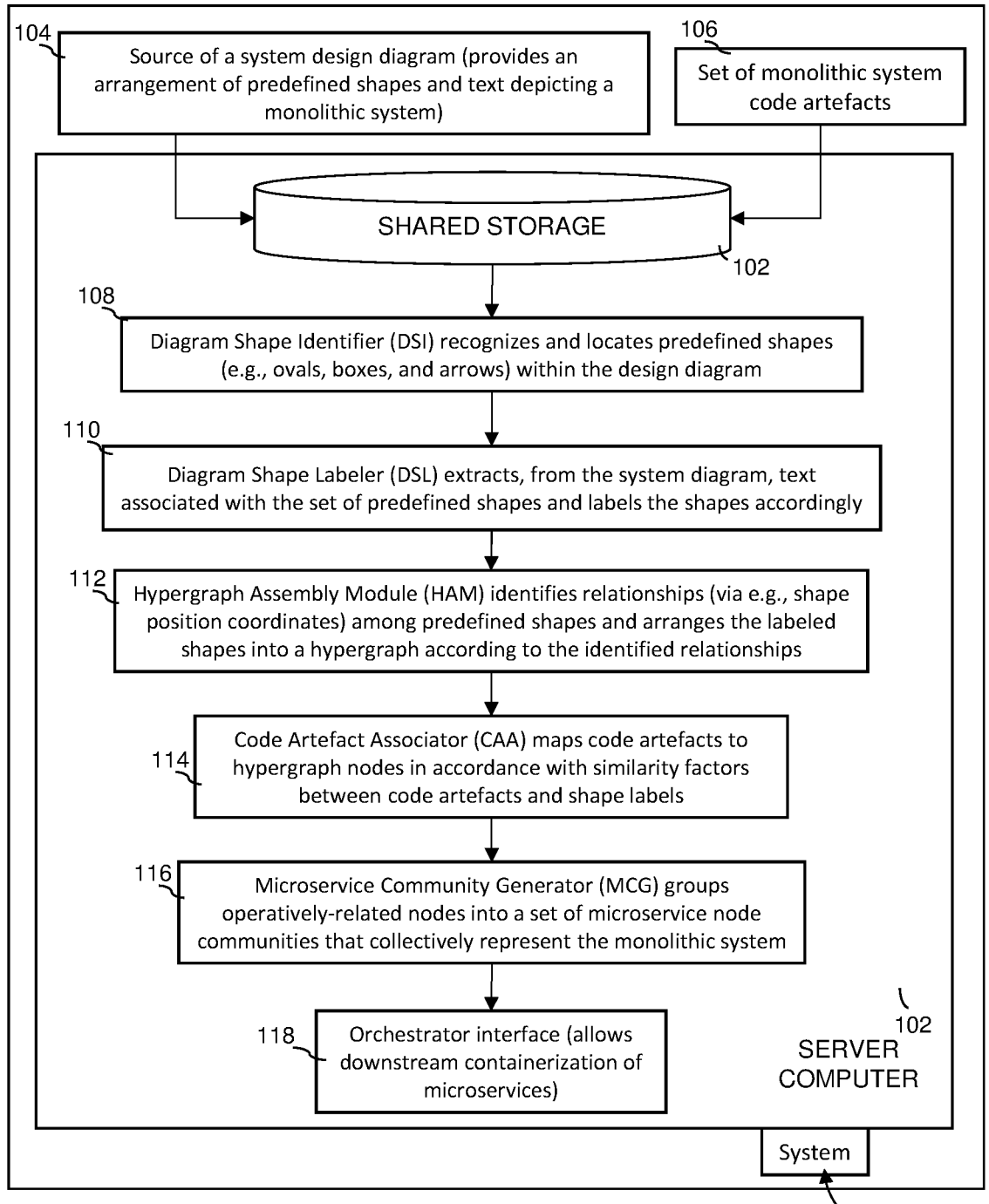
FIG. 1 is a schematic block diagram illustrating an overview of a system for computer-implemented identifying, from a monolithic system design diagram, a set of microservices that represents the monolithic system.
Figure 2:
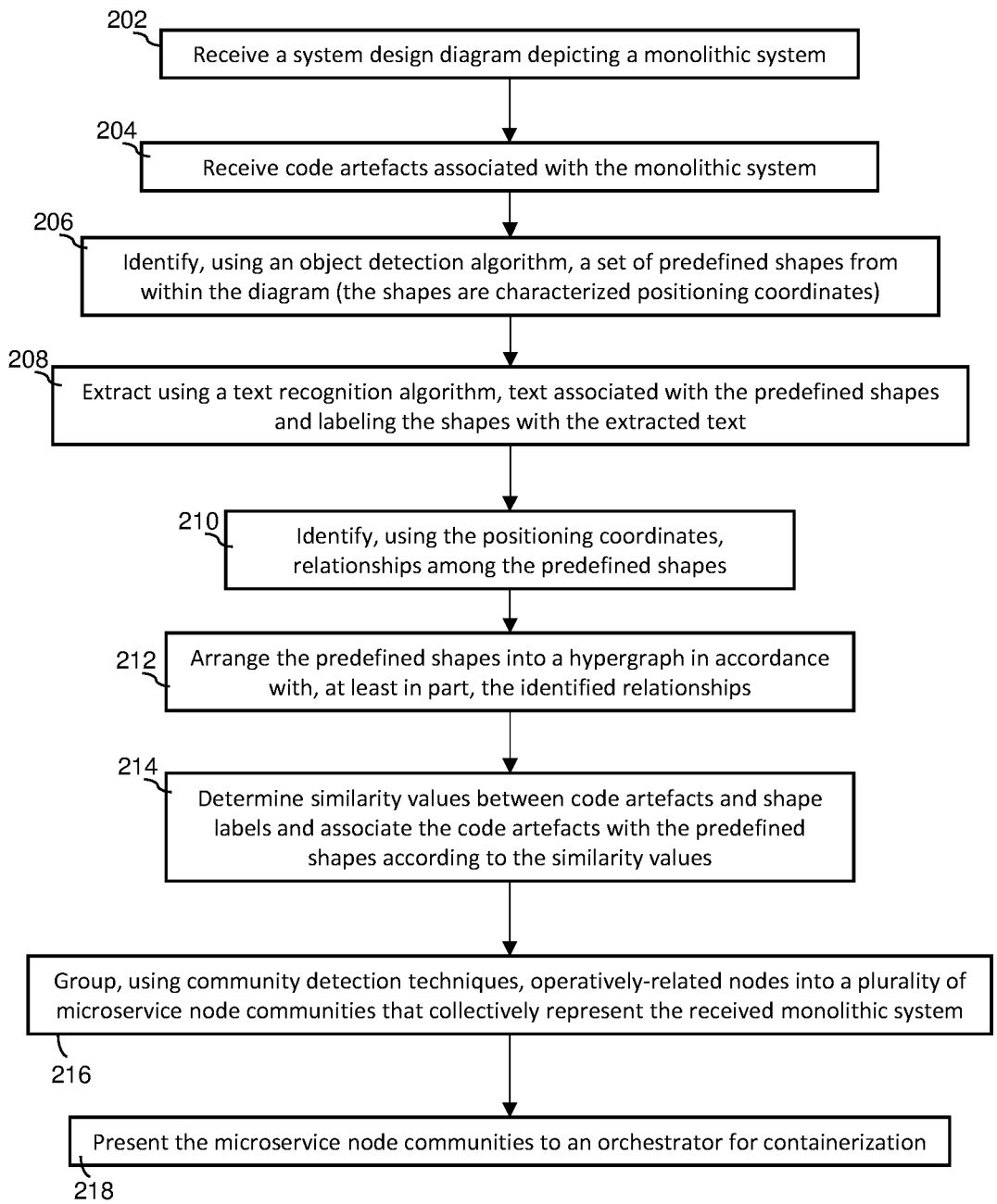
FIG. 2 is a flowchart illustrating a method, implemented using the system shown in FIG. 1, of identifying, from a monolithic system design diagram, a set of microservices that represents the monolithic system according to aspects of the invention.

Now with combined reference to the Figures generally and with particular reference to FIG. 1 and FIG. 2, an overview of a method to generate, from a monolithic system or application design diagram, a set of microservices that represents the monolithic application usable within a system 100 as carried out by a server computer 102 having optionally shared storage 102 and aspects that identify shapes, relative shape locations, and text content of a monolithic system design diagram, associate those components with received system code artefacts, and generate a set of microservices that represents the monolithic system.

Figure 3:
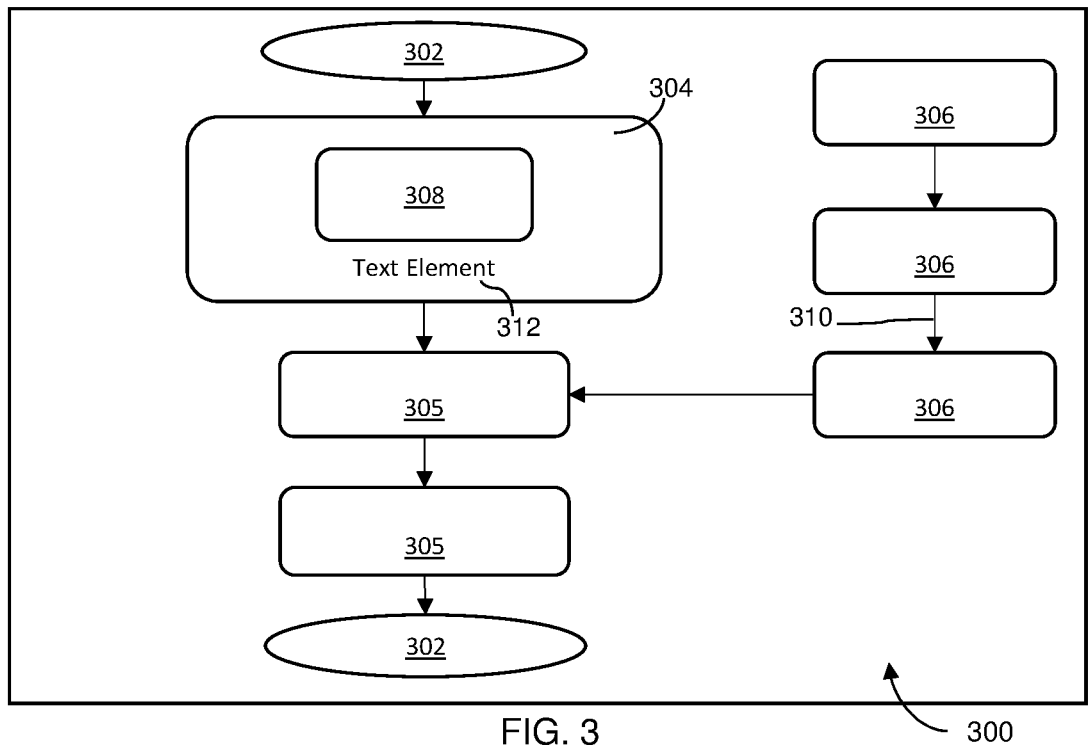
FIG. 3 is a schematic representation of design diagram monolithic computer system from which a set of microservices may be identified according to aspects of the invention.
Figure 4:
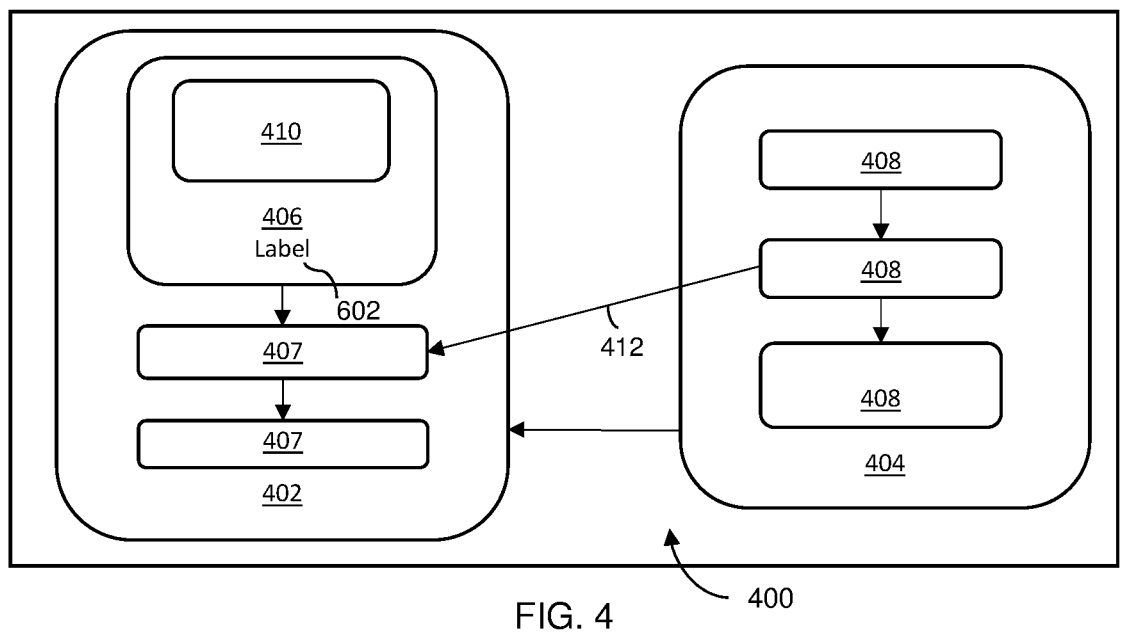
FIG. 4 is a schematic representation of a set of hypergraph including a set of microservices generated according to aspects of the present invention that represents aspects of the monolithic system shown in FIG. 3.

The server computer 102 is in communication with a system diagram source 104 that receives a system design diagram 300 (e.g., as shown in FIG. 3) that includes an arrangement of predefined shapes and text that depicts a monolithic software system. It is noted that although standard Unified Modeling Language (UML) diagrams can be used, other diagram standards may be selected in accordance with the judgment of a system designer skilled in this field. The server computer 102 also receives a set of monolithic system code artefacts 106 including functions, classes, modules, and documentation (it is noted that more, or fewer, items may be provided at the judgment of a system designer having skill in this field) for the system shown in the design diagram 300. The server computer 102 includes Diagram Shape Identifier (DSI) 108 that recognizes and locates predefined shapes in the design diagram 104. The DSI 108 generates a set of identified shapes and collects shape position coordinates for the shapes in the set. The server computer 102 includes Diagram Shape Labeler (DSL) 110 that extracts, from the system diagram, text associated with the shapes in the set and labels the shapes accordingly. The server computer 102 includes Hypergraph Assembly Module (HAM) 112 that identifies relationships (via, e.g., shape position coordinates) among predefined shapes and arranges the labeled shapes into a hypergraph (seen, e.g., in the system diagram 300) according to the identified relationships. More particularly, the HAM 112 uses the relationships identified among the shapes to place the various ovals 302, boxes 304, 305, 306, 308, and arrows 310 into a hypergraph (as shown, e.g., in FIG. 4) that reflects the identified relationships. Common relationships include node/node, node/edge, component/subcomponent, and module/submodule. The server computer 102 includes Code Artefact Associator (CAA) 114 that maps code artefacts to hypergraph nodes in accordance with calculated similarity factors that indicate textual similarity between code artefacts and shape labels (e.g., lexical and semantic similarity). The sever computer 102 includes Microservice Community Generator (MCG) 116 that groups operatively-related nodes into a set of microservice node communities that collectively represent the monolithic system. The server computer 102 includes orchestrator interface 118 that allow the computer to provide the set of microservices to an orchestrator (not shown) for further processing (e.g., containerization, etc.).

Figure 5:
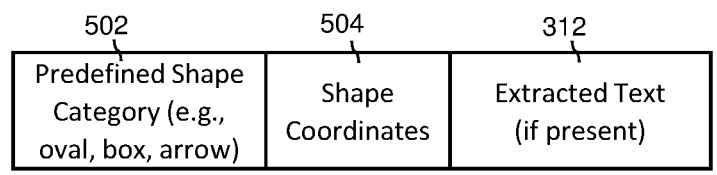
FIG. 5 is a tabular representation of a shape metadata record according to aspects of the invention.

Now, with reference to FIG. 2 (and with additional reference to FIG. 3, FIG. 4, FIG. 5, and FIG. 6), an overview of a method to identify, from a monolithic system design diagram 300, a set 400 of microservices 402, 404 that represents the monolithic system illustrated in the diagram, according to aspects of the invention will be described. The server computer 102 receives, at block 202, a system diagram 300 (e.g., as shown schematically in FIG. 3). The system diagram 300 includes a set of predefined shapes, including ovals 302, boxes 304, 305, 306, 308, and arrows 310 that signify system components and indicate relative flow direction through the system. Each shape is characterized by an associated set of coordinates (e.g., as shown generically at 504 in FIG. 5) that indicates the location of the shape within the diagram 300, as well as the size of the shape. The set of coordinates 504 for a given component also indicates the relative position of that component with respect to other components in the system diagram. In some cases, coordinates of a first shape (e.g., shape 308) when compared to the coordinates of a second shape (e.g., shape 304), indicate that the first shape is contained within the second shape in the system diagram 300. In such instances, this arrangement indicates that the first shape 308 is a sub-element (e.g., a subcomponent, a submodule, or other operational subordinate appropriate to the received system, as known by those skilled in this field) of the second shape 304. The shapes collectively portray a monolithic software system from which aspects of the invention will generate a representative set 400 of microservices 402,404. The system diagram 300 also includes text elements which, as will be described below, are useful to determine component labels, thereby facilitating association of identified system components with the received system artefacts 106.

The server computer 102, at block 204, receives code artefacts 106 associated with the monolithic system shown in diagram 300. The code artefacts received 106 may be included in system documentation and can vary from system to system. The artefacts are selected in accordance with the judgment of a system designer skilled in this field, and typical artefacts include code segments at a function, class, and file levels depending on provided system descriptions, comments, and other documentation.

The server computer 102, via Diagram Shape Identifier (DSI) 108 at block 206, using an object detection algorithm, identifies a set of predefined shapes from within the diagram 300. According to aspects of the invention, the set of identified shapes includes the ovals 302, boxes 304, 305, 306, 308, and arrows 310 described above. As part of the identification process, the DSI collects shape metadata record and creates a corresponding shape metadata record 500 that includes a shape category 502 (e.g., oval, box, arrow, etc.), shape coordinates 504, which vary by shape category (e.g., ovals and boxes may have several pairs of cartesian coordinates that place and size the associated shape within the system diagram; arrow size and position may be adequately indicated with only one pair of coordinates; etc.) As noted above, the DSI 108 uses image analysis techniques selected by a system designer having skill in this field to recognize predefined shapes (e.g., boxes, ovals, arrows, and other such predefined shapes used in typical system design diagrams) within the design diagram image. The DSI 108 also extracts positioning coordinates 504 for the shapes and compares the coordinates sets of each identified shape.

The server computer 102 extracts, via Diagram Shape Labeler (DSL) 110 at block 208, using a text recognition algorithm, text elements (e.g., shown schematically at 336 in FIG. 3) associated with the predefined shapes and labels the shapes with the extracted text. This extracted text 312 is added to the metadata record 500 for the shape from which the text is extracted, and the associated label 602 is added to a hypergraph element record 600 for each shape. As described more fully below, the resultant labels 602 are used to identify elements in the hypernode It is noted that some elements (e.g., arrows) will commonly not have text (nor a resultant label), and the associated hypergraph metadata record simply includes a null value as a placeholder. It is noted that null value placeholders may also be used in shape metadata records 500 and in other locations in hypergraph metadata records 600 for which no information is available.

The server computer 102 identifies, via Hypergraph Assembly Module (HAM) 112 at block 210, using shape metadata (including, e.g., extracted shape categories 502 and positioning coordinates 504), relationships among the predefined shapes. Identified shape relationships include component/arrow, component/component, component/subcomponent, module/submodule, and so on, depending on the nature of the system shown in the diagram 300. According to aspects of the invention, the shapes in the system diagram 300 are further identified by hypergraph element metadata record 600 that includes a component type 606 (e.g., hypernode, hyperedge, etc.), a status 608 (e.g., element, sub-element, etc.) relative to other shapes.

Once the HAM 112 identifies the relationships among the shapes, the HAM, at block 212, arranges the labeled shapes into a hypergraph (e.g., as shown at 400 in FIG. 4) according to the identified relationships. More particularly, relationships identified among the shapes in the system diagram 300 are converted into appropriate hypergraph relationships (e.g., typical relationships include node/node (for ovals 320 and boxes 304, 305, 306), node/edge (for ovals or boxes and arrows 310), component/subcomponent (for nested boxes), where a box 308 is located inside another box 304), and module/submodule (where several boxes are located inside one or more other boxes). It is noted that other hypergraph relationships may also be identified, depending on the nature of the system shown in the design diagram 300. A hypergraph 400 of the monolithic system shown in design diagram 300 includes microservices 402, 404. Microservice 402 includes nodes 406, 407, and 410, with node 410 being a sub-element of node 406; this arrangement reflects the relationships present among components 304, 305, and 308, as shown in FIG. 3 and as identified by the HAM 112. Microservice 402 includes nodes 408. Nodes 406, 407, 408 within the microservices 402, 404 are connected by edges (indicated by arrows) 412 that show direction of process flow within the hypergraph 400. According to aspects of the invention, the HAM 112 creates, for each component and module, a hypernode 407, 408 in the hypergraph having a label 602 corresponding to the associated extracted text 312 (where present). Similarly, the HAM 112 creates, for each submodule (and subcomponent), a hypernode 406 containing the submodule (subcomponents) 410 nodes, with a label 602 represented associated extracted text 312. According to aspects of the invention, hyperedges 412 are generated where two modules (or components) are linked in the system diagram by an arrow 310. According to aspects of the invention, hyperedges 412 are also generated where two submodules and subcomponents are linked in the system diagram by an arrow 310. It is noted that non-directional linking lines (not shown) may also be used to form hyperedges, and that where arrows are used, direction of the arrow provides edge flow direction.

The server computer 102 via Code Artefact Associator (CAA) 114 at block 214, measures textual similarity between a selected code artefact and a selected system element label, determining similarity values between code artefacts and shape labels. According to aspects of the invention, the CAA 114 associates a subset of code artefacts 604 with the predefined shapes according to the similarity values, assigning received artefacts to the system component having labels to which the artefacts are most similar. The code artefacts 106 typically include functions, classes, modules, documentation of the system at code level, and the CAA 114 maps the artefacts to nodes the hypergraph 400. The unit of code segment received can be at various levels, including function level, class level, and filed level, and can vary depending on available descriptions, comments, and other similar documentation availability. According to aspects of the invention, the CAA 114 identifies, for functions received, comments associated with the function and uses those comments as a description for the function. According to aspects of the invention, the CAA 114 identifies, for classes received, comments and documentation associated with the class and creates a description of the class, including a description of the functions present and content from the class comments and documentation. According to aspects of the invention, the CAA 114 identifies, for files received, comments and documentation associated with the files and creates a description of a file that describes the classes present and content from the class comments and documentation. The CAA 114 generates, for each description generated as described above, an embedding vector (using known embedding generation techniques selected by one skilled in this field) that represents the description. The CAA 114 then generates, for each hypernode in the hypergraph 400, an embedding vector (using known embedding generation techniques selected by one skilled in this field. The CAA 114 computes a similarity value (e.g., a cosine similarity or other known method of comparing vector similarity selected by one of skill in this field) between the description embedding vectors and the node embedding vectors. The CAA 114 then maps the received artefacts 106 to hypergraph nodes to which the artefact has highest cosine similarity.

The server computer 102 groups, using community detection techniques via Microservice Community Generator (MCG) 116 at block 216, operatively-related nodes into a plurality of microservice node communities that collectively represent the monolithic system, and a microservice assignment value 610 is assigned to the elements in the hypergraph 400. Using a community detection technique (such as the Girvan-Newman Algorithm, Edge Betweenness Centrality (EBC) computation, or other known node clustering approach selected by one skilled in this field) on the hypernode graph 400, the MCG 116 generates a set of microservice communities. As used herein, a community is a cluster of operationally-related nodes in the design hypernode graph 400, and each community is be treated as a candidate microservice 402, 404 candidate for the monolithic system shown in the received system diagram 300. The term operatively-related, as used herein, refers to a group of nodes that collectively represent a microservice and which have negligible reliance or functional interaction on nodes outside of the group to which the nodes are assigned. According to aspects of the invention, groups of operatively-related nodes clustered into microservices may have minimal dependency between them, as when a hyperedge 412 from a hypernode 408 in one microservice 404 has a dependency on a hypernode 407 in another microservice.

According to aspects of the invention, the server computer 102 may assist with containerization of the generated set of microservices. At block 218, the server computer via orchestrator interface 118, makes the microservice node communities 402, 404 available to an orchestrator (not shown) for further processing.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
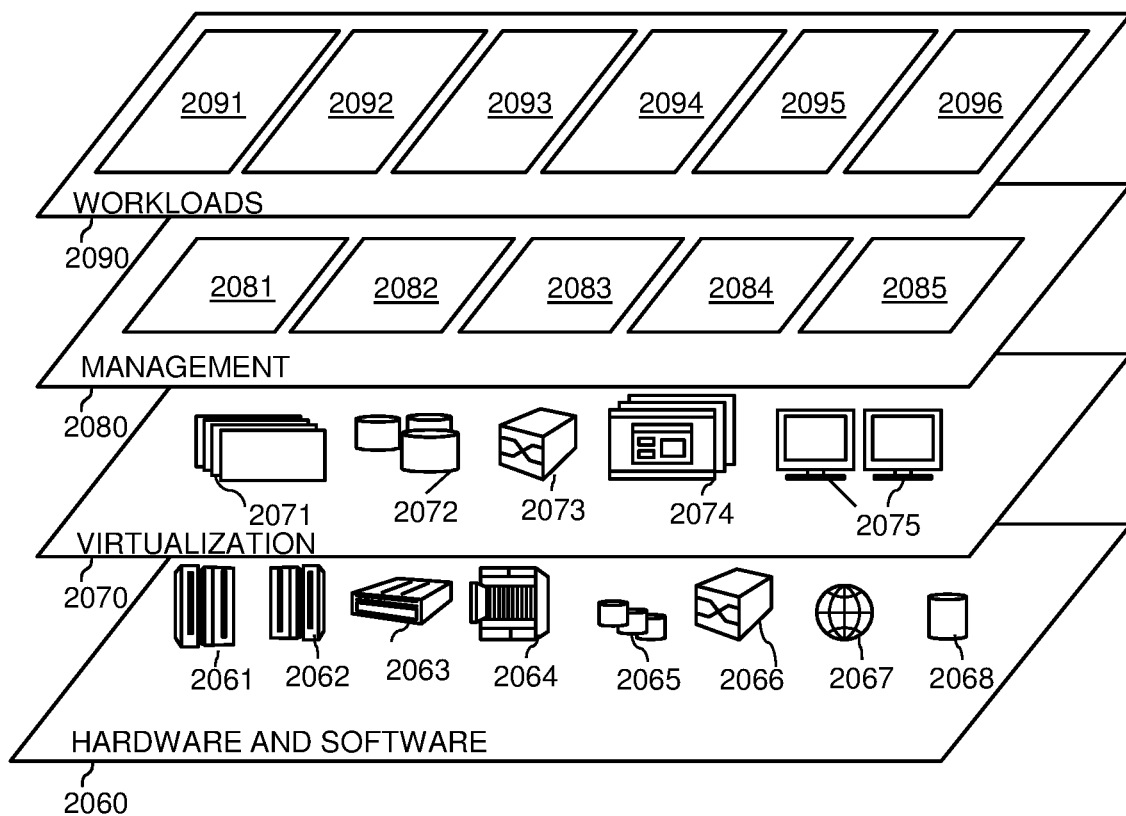
FIG. 9 depicts abstraction model layers according to an embodiment of the present invention.

Referring to FIG. 9, a system or computer environment 1000 includes a computer diagram 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 (shown in FIG. 9) can include all or part of the computer system 1010 and its components, and/or the control system can communicate with all or part of the computer system 1010 and its components as a remote computer system, to achieve the control system functions described in the present disclosure. It is also understood that the one or more communication devices 110 shown in FIG. 1 similarly can include all or part of the computer system 1010 and its components, and/or the communication devices can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
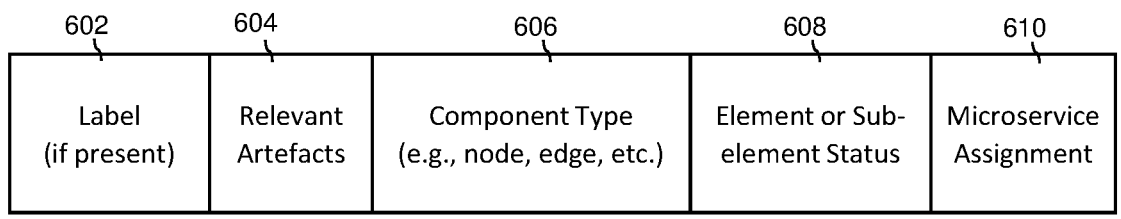
FIG. 6 is a tabular representation of a hypergraph element metadata record according to aspects of the invention.
Figure 7:
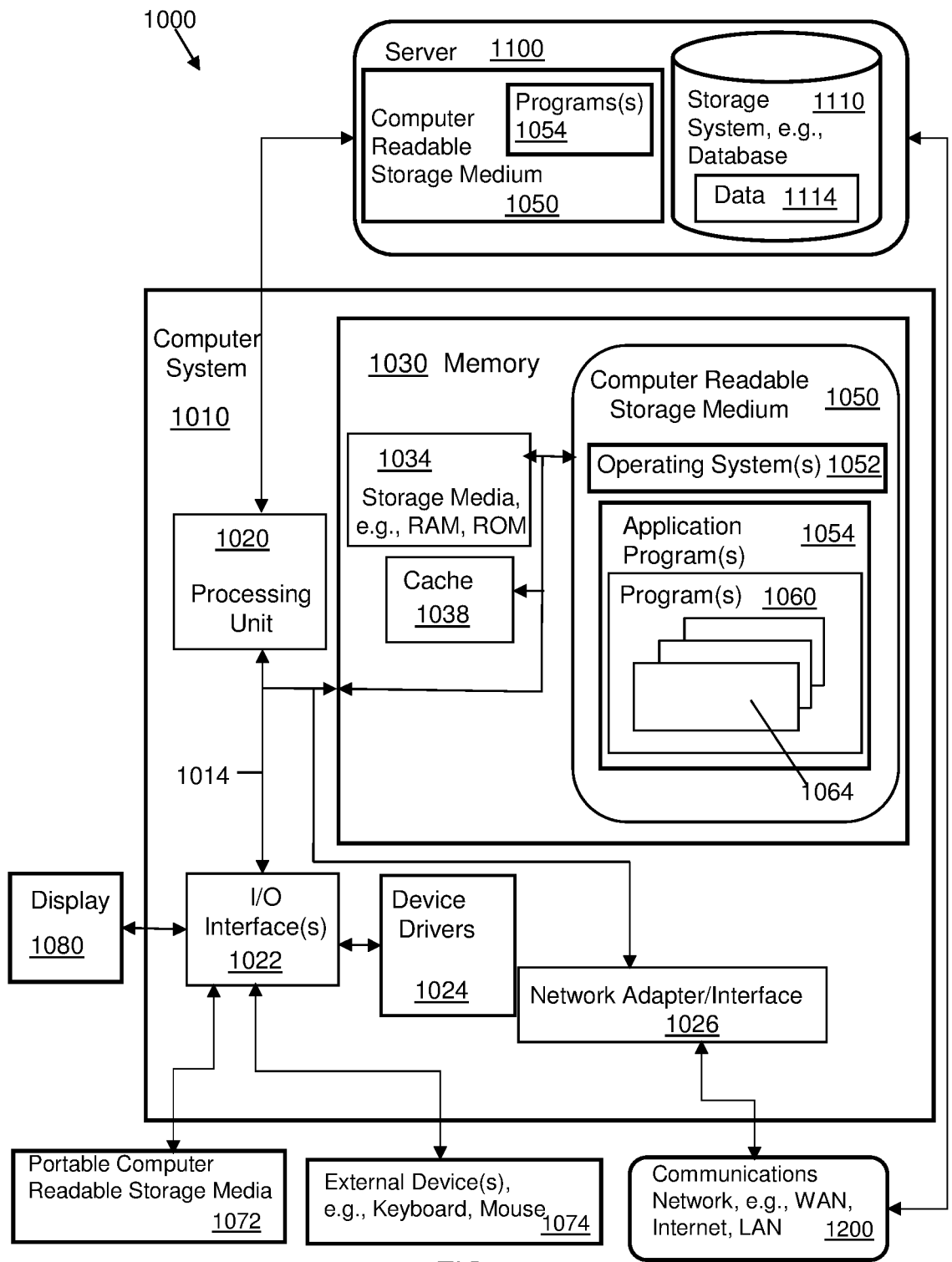
FIG. 7 is a schematic block diagram depicting a computer system according to an embodiment of the disclosure which may be incorporated, all or in part, in one or more computers or devices shown in FIG. 1, and cooperates with the systems and methods shown in FIG. 1.
Figure 8:
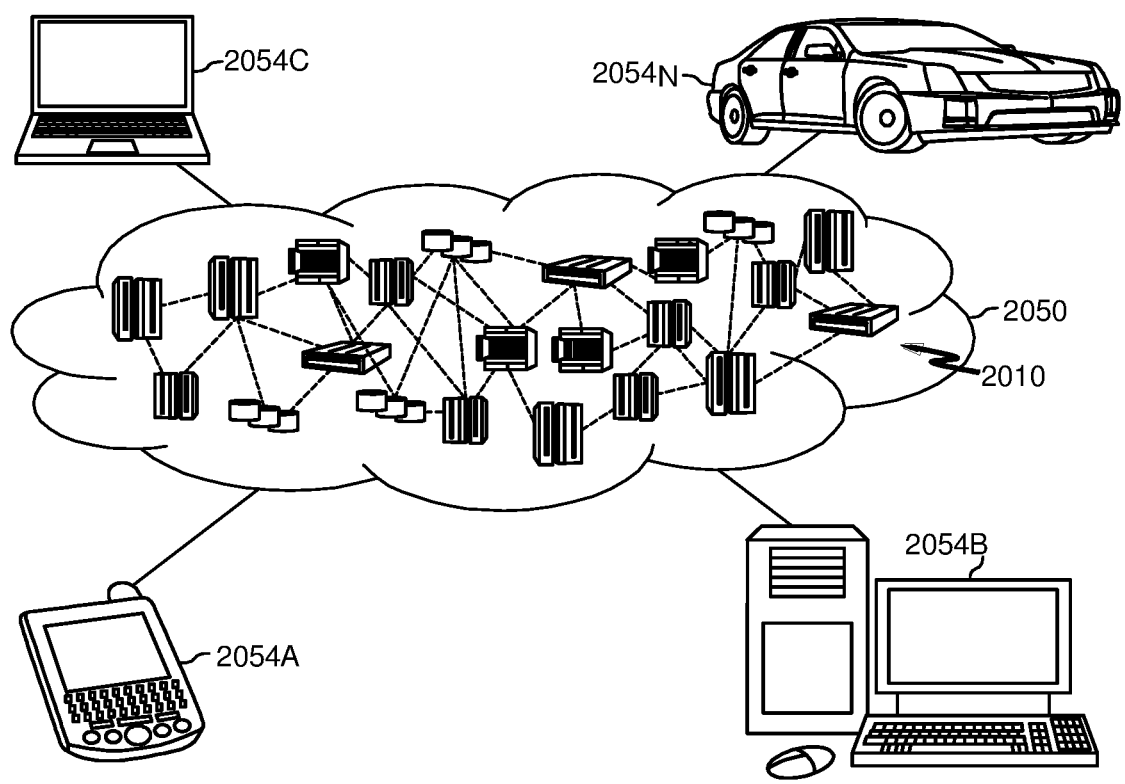
FIG. 8 depicts a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 6 are intended to be illustrative only and that computing nodes 2010 and cloud computing environment 2050 can communicate with any type of computerized device over any type of network and/or network addressable connection (e.g., using a web browser).

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and generating sets of representative microservices from monolithic system design diagrams 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method executed by a computer to generate a set of microservices associated with a monolithic system using a design diagram, said method comprising:
   receiving, by said computer, a system design diagram depicting a monolithic system;
   receiving, by said computer, code artefacts associated with said monolithic system;
   identifying, by said computer, using an object detection algorithm, a set of predefined shapes from within said system design diagram, each characterized by positioning coordinates;
   extracting, by said computer, from said system design diagram, using a text recognition algorithm, text associated with said set of predefined shapes and labeling said set of predefined shapes in accordance with said extracted text;

identifying, by said computer, using said positioning coordinates, relationships among said set of predefined shapes;

arranging, by said computer, said set of predefined shapes into a hypergraph in accordance with, at least in part, said identified relationships;

determining, by said computer, similarity values between the code artefacts and shape labels and associating, by said computer, said code artefacts with the set of predefined shapes in accordance therewith; and grouping, by said computer, using a community detection algorithm, operatively-related nodes into a plurality of microservice node communities that represents said monolithic system.

2. The method of claim 1, wherein said similarity values measure textual similarity between a selected code artefact and a selected system element label.

3. The method of claim 1, wherein said identified relationships are selected from a list consisting of node and node, node and edge, node and operational subordinate.

4. The method of claim 1, wherein responsive to a determination that a first predefined shape is, based on the positioning coordinates of said set of predefined shapes, contained within a second predefined shape, identifying, by said computer, said first predefined shape as an operational subordinate of the second predefined shape.

5. The method of claim 1, wherein said hypergraph contains a plurality of nodes and edges that correspond respectively to boxes and arrows in said system design diagram.

6. The method of claim 1, wherein said community detection algorithm comprises techniques selected from a list consisting of agglomerative clustering methods and divisive clustering methods.

7. The method of claim 1, wherein artefacts are selected from a list consisting of system functions, system classes, system modules, and system documentation.

8. A system to generate a set of microservices associated with a monolithic system using a design diagram, which comprises:

a computer system comprising a computer readable storage medium having program instructions embodied therewith, the program instructions executable by a computer hardware processor to cause the computer to:

receive a system design diagram depicting a monolithic system;

receive code artefacts associated with said monolithic system;

identify using an object detection algorithm, a set of predefined shapes from within said system design diagram, each characterized by positioning coordinates;

extract from said system design diagram, using a text recognition algorithm, text associated with said set of predefined shapes and labeling said set of predefined shapes in accordance with said extracted text;

identify using said positioning coordinates, relationships among said set of predefined shapes;

arrange said set of predefined shapes into a hypergraph in accordance with, at least in part, said identified relationships;

determine similarity values between the code artefacts and shape labels and associate said code artefacts with the set of predefined shapes in accordance therewith; and group, using a community detection algorithm, operatively-related nodes into a plurality of microservice node communities that represents said monolithic system.

9. The system of claim 8, wherein said similarity values measure textual similarity between a selected code artefact and a selected system element label.

10. The system of claim 8, wherein said identified relationships are selected from a list consisting of node and node, node and edge, node and operational subordinate.

11. The system of claim 8, wherein responsive to a determination that a first predefined shape is, based on the positioning coordinates of said set of predefined shapes, contained within a second predefined shape, identifying said first predefined shape as an operational subordinate of the second predefined shape.

12. The system of claim 8, wherein said hypergraph contains a plurality of nodes and edges that correspond respectively to boxes and arrows in said system design diagram.

13. The system of claim 8, wherein said community detection algorithm comprises techniques selected from a list consisting of agglomerative clustering methods and divisive clustering methods.

14. The system of claim 8, wherein artefacts are selected from a list consisting of system functions, system classes, system modules, and system documentation.

15. A computer program product to generate a set of microservices associated with a monolithic system using a design diagram, the computer program product comprising a computer readable storage medium having program instructions embodied therewith, the program instructions executable by a computer hardware processor to cause the computer to:

receive, using said computer, a system design diagram depicting a monolithic system;

receive, using said computer, code artefacts associated with said monolithic system;

identify, using said computer, using an object detection algorithm, a set of predefined shapes from within said system design diagram, each characterized by positioning coordinates;

extract, using said computer, from said system design diagram, using a text recognition algorithm, text associated with said set of predefined shapes and labeling said set of predefined shapes in accordance with said extracted text;

identify, using said computer, using said positioning coordinates, relationships among said set of predefined shapes;

arrange, using said computer, said set of predefined shapes into a hypergraph in accordance with, at least in part, said identified relationships;

determine, using said computer, similarity values between the code artefacts and shape labels and associate, using said computer, said code artefacts with the set of predefined shapes in accordance therewith; and group, using said computer, using a community detection algorithm, operatively-related nodes into a plurality of microservice node communities that represents said monolithic system.

16. The computer program product of claim 15, wherein said similarity values measure textual similarity between a selected code artefact and a selected system element label.

17. The computer program product of claim 15, wherein said identified relationships are selected from a list consisting of node and node, node and edge, node and operational subordinate.

18. The computer program product of claim 15, wherein responsive to a determination that a first predefined shape is, based on the positioning coordinates of said set of predefined shapes, contained within a second predefined shape, identifying said first predefined shape as an operational subordinate of the second predefined shape.

19. The computer program product of claim 15, wherein said hypergraph contains a plurality of nodes and edges that correspond respectively to boxes and arrows in said system design diagram.

20. The computer program product of claim 15, wherein said community detection algorithm comprises techniques selected from a list consisting of agglomerative clustering methods and divisive clustering methods.

* * * * *